United States Patent [19]

Ueno

[11] Patent Number: 5,557,463
[45] Date of Patent: Sep. 17, 1996

[54] EYEPIECE

[75] Inventor: Yasunori Ueno, Kanagawa, Japan

[73] Assignee: Nikon Corporation, Tokyo, Japan

[21] Appl. No.: 276,713

[22] Filed: Jul. 18, 1994

[30] Foreign Application Priority Data

Jul. 19, 1993 [JP] Japan .................... 5-198788

[51] Int. Cl.⁶ .......................... G02B 25/00; G02B 13/18
[52] U.S. Cl. ............................ 359/646; 359/717
[58] Field of Search .................... 359/646, 717, 359/643, 644, 645

[56] References Cited

U.S. PATENT DOCUMENTS 2,528,468  10/1950  Cojan ........................... 359/646
3,472,577  10/1969  Rosin et al. ................... 359/646
5,162,945  11/1992  Matsuo et al. ................. 359/646

Primary Examiner—Scott J. Sugarman
Attorney, Agent, or Firm—Michael N. Meller

[57] ABSTRACT

An eyepiece capable of compensating various aberrations despite its simple construction including a relatively small number of lenses. The eyepiece includes, in the order from an eyepoint side, a first lens group of a positive refractive power composed of a single positive lens and a second lens group of a positive refractive power composed of a cemented lens of a positive lens and a negative lens, and the positive lens of the first lens group has at least one of its lens surfaces formed into an aspherical surface shape. The radius of curvature at the peripheral portion of the aspherical surface is greater than the radius of curvature at the apex portion of the aspherical surface.

12 Claims, 4 Drawing Sheets

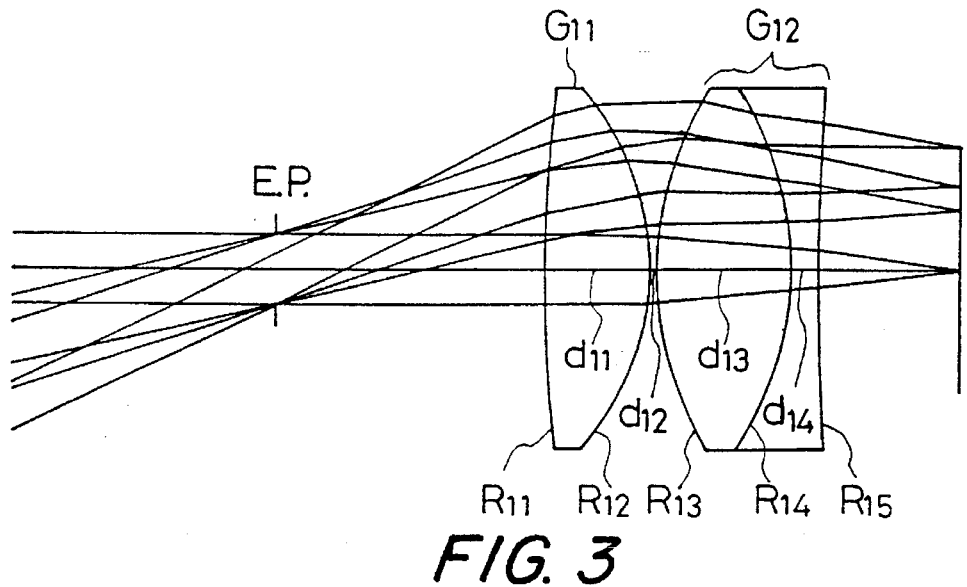
FIG. 3
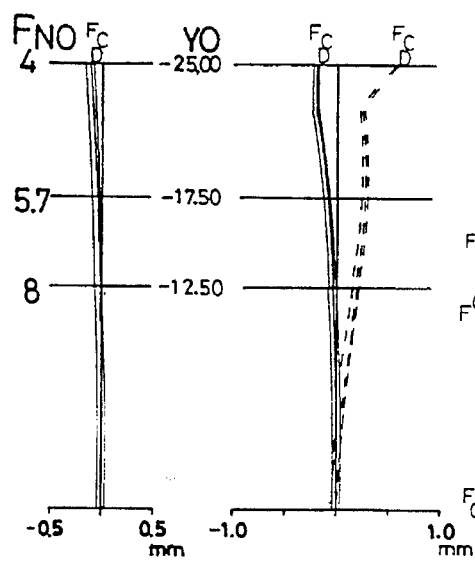
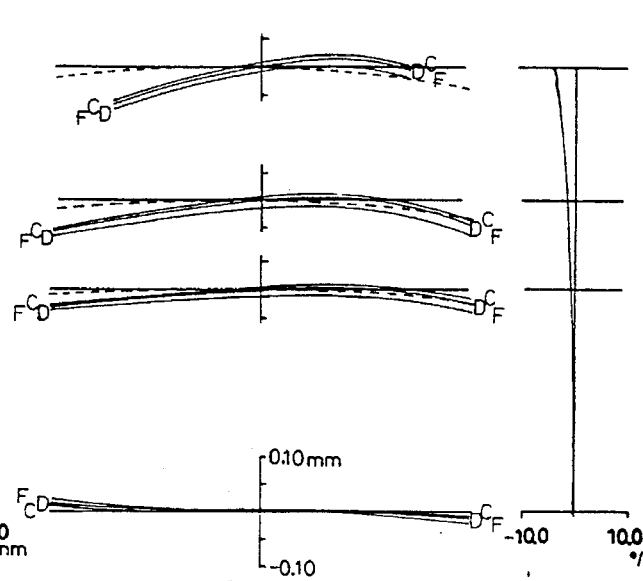
FIG.4a  FIG.4b  FIG.4c  FIG.4d

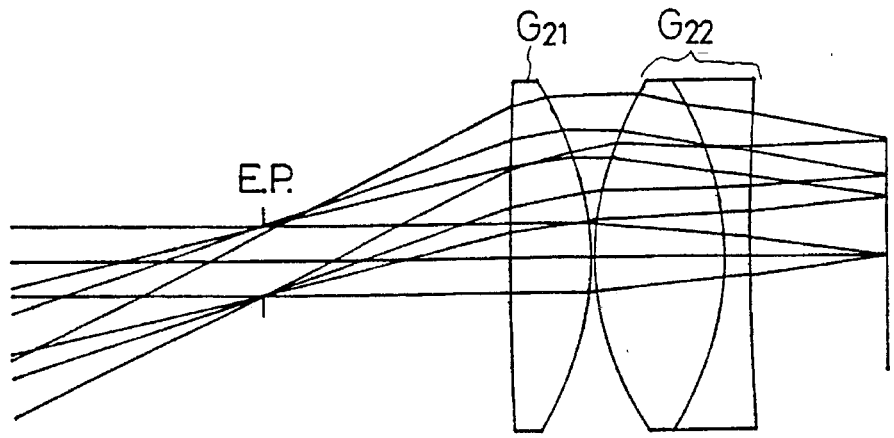
FIG. 7
PRIOR ART
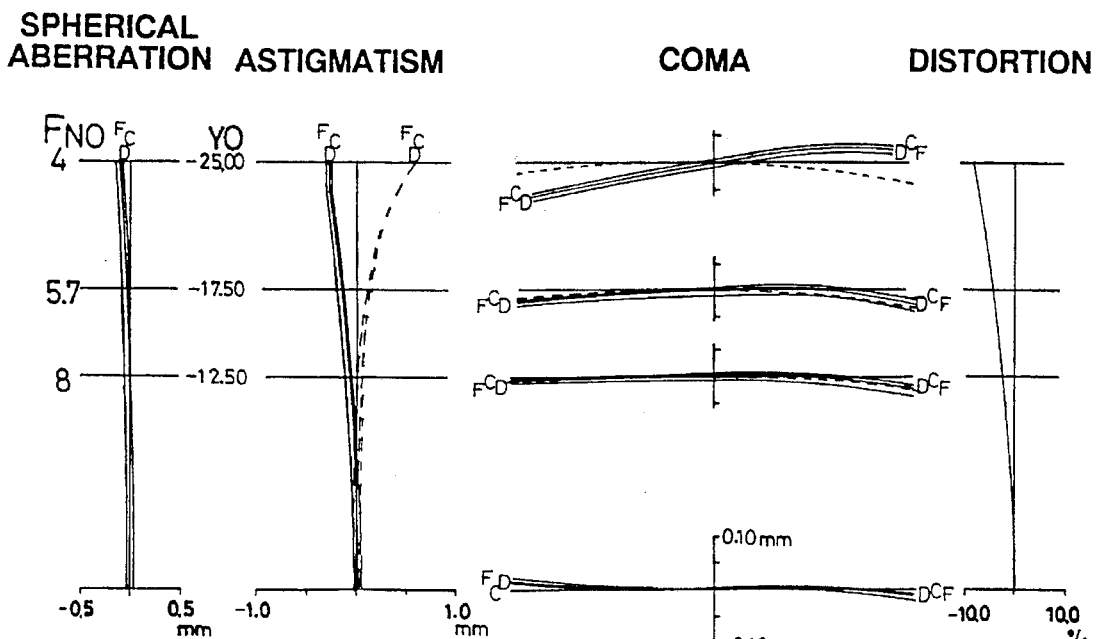
FIG. 8a
PRIOR ART
FIG. 8b
PRIOR ART
FIG. 8c
PRIOR ART
FIG. 8d
PRIOR ART

EYEPIECE

BACKGROUND OF THE INVENTION

1. Field of the Invention

The present invention relates to an eyepiece which is used for example in telescopes and microscopes.

2. Related Background Art

Usually, such optical instrument as a telescope or microscope employs an eyepiece for further magnifying and observing a real image formed by an objective lens. Referring now to FIGS. 7 and 8, there is illustrated an example of the conventional eyepieces.

Shown in FIG. 7 is an eyepiece including, in the order from the eyepoint (E.P.) side, a first lens group $G_{21}$ composed of a single positive lens component and a second lens group $G_{22}$ of a positive refractive power composed of a cemented lens of a positive lens and a negative lens. The focal length f of this eyepiece is 10 mm and the apparent field of view is 51°. The aberration diagram of this eyepiece is as shown in FIG. 8.

With such conventional eyepiece having a relatively large field angle, a relatively large distortion aberration appears as will be seen from FIG. 8. In order to provide a fully satisfactory aberration compensation even for the peripheral portion of the visual field in such eyepiece, there is a problem that the addition of a compensation optical system is required for this purpose and therefore the number of lenses used in the eyepiece system on the whole is inevitably increased. Particularly, the compensation of distortion aberration is difficult thus tending to result in a lens construction including 4 to 6 lenses.

SUMMARY OF THE INVENTION

It is an object of the present invention to provide an eyepiece which overcomes the foregoing deficiencies in the prior art and is capable of satisfactorily compensating various aberrations despite its simple construction having a reduced number of lenses.

To accomplish the above object, in accordance with an aspect of the present invention there is thus provided an eyepiece including in the order from the eyepoint side:

a first lens group having a positive refractive power, and a second lens group having a positive refractive power, said first lens group including a positive lens, said second lens group including a cemented lens formed by cementing a nagative lens and a positive lens together, and the positive lens of said first lens group having at least one of the lens surfaces thereof made of an aspherical surface.

The eyepiece of the present invention includes, in the order from the eyepoint side, the first lens group of a positive refractive power including a single positive lens, and the second lens group of a positive refractive power including a cemented lens, and at least one of the eyepoint-side lens surface and the image-side lens surface of the positive lens of the first lens group is formed into an aspherical surface. In this case, the radius of curvature at the peripheral portion of such aspherical surface should preferably be greater than the radius of curvature at the apex of the aspherical surface.

In connection with the eyepiece of the present invention having the foregoing features, the principle of aberration compensation will now be described with reference to FIGS. 5 and 6.

Here, let us suppose a case in which a compensator plate is added to the eyepiece and this compensator plate is formed to have an aspherical surface so as to provide the compensation of distortion aberration (the aberration of the pupil). In other words, let us consider a construction in which as shown in FIG. 5, a compensator plate $L_c$ having an aspherical surface shape is arranged between the front focal plane F of a spherical lens group $L_e$ forming a part of the eyepiece and the lens group $L_e$ whereby pupil aberration or distortion aberration of the eyepiece is compensated for by the compensator plate $L_c$ and the essential aberration compensation for the eyepiece is effected by the lens group $L_e$.

Let it be assumed that as shwon in FIG. 6, the shape of the compensator plate $L_c$ is given by the following equation (1) using q as a constant.

$$x = q \cdot y^4 \tag{1}$$

The angle θ of the tangent can be obtained by differentiating equation (1). In other words, considering in terms of the region of the third-order aberration, the angle θ is given by the following equation.

$$\theta = 4 \cdot q \cdot y^3$$

If n represents the refractive index of the compensator plate $L_c$, θ' the angle of a light ray R after its passage through the aspherical surface and δ the angle of deviation of the light ray due to the aspheric surface, δ is given by the following equation (2).

$$\delta = \theta' - \theta = (n-1)\theta = 4(n-1)q \cdot y^3 \tag{2}$$

On the other hand, the pupil aberration ΔS' due to the eyepiece is given by the following equation (3) in the region of the third-order aberration with A representing a constant. Here, represented by y is the height of the light ray incident on the eyepiece.

$$\Delta S' = A \cdot y^2 \tag{3}$$

Assuming now that β represents the pupil image magnification of the eyepiece, equation (3) can be rewritten as the following equation (4).

$$\Delta S' = \beta^2 \cdot \Delta S \tag{4}$$

Also, assuming that the distance S to the entrance pupil is sufficiently large as compared with the focal length of the eyepiece, ΔS and the deviation angle δ have the correlation shown by the following equation (5).

$$\Delta S = S^2 \cdot \delta / y = 4(n-1)q \cdot S^2 \cdot y^2 \tag{5}$$

Substituting equation (5) into equation (4), we obtain the following equation (6).

$$\Delta S' = 4(n-1)\beta^2 \cdot q \cdot S^2 \cdot y^2 \tag{6}$$

From a comparison between equations (6) and (3) it will be seen that if the constant A in the right member of equation (3) is determined as shown by the following equation (7), equations (3) and (6) coincides with each other.

$$A = 4(n-1)\beta^2 \cdot q \cdot S^2 \tag{7}$$

Therefore, by determining the value of q in equation (1) so as to cancel the aberration ΔS' of the pupil which is given by equation (3), there results the eyepiece which on the whole has no distortion aberration. By rewriting equation (1) accordingly, it is possible to obtain the following equation (8).

$$x = q \cdot y^4 = A/\{4(n-1)\beta^2 \cdot S^2\} y^4 \quad (8)$$

On the other hand since $\beta = S'/S$ results if the eye relief is represented by $S'$, equation (8) can be rewritten as the following equation (9).

$$x = A/\{4(n-1)S'^2\} y^4 \quad (9)$$

In this case, if x represents the distance from the apex which is measured in the optical axis direction, y the distance from the apex which is measured in a direction perpendicular to the optical axis, $C_0 = 1/R$, R the radius of curvature at the apex, k the conic constant, and $C_4$, $C_6$, $C_8$ and $C_{10}$ the fourth-order, sixth-order, eighth-order and tenth-order aspherical coefficients, respectively, the constant q corresponds to the coefficient $C_4$ of the fourth-order term $y^4$ in the following general expression showing the aspherical surface.

$$x = C_0 \cdot y^2/\{1+(1-k \cdot C_0^2 \cdot y^2)^{1/2}\} + C_4 \cdot y^4 + C_6 \cdot y^6 + C_8 \cdot y^8 + C_{10} \cdot y^{10} \quad (10)$$

It is to be noted that in equation (9) $S'$ represents the eye relief of the eyepiece and therefore the value of $S'$ can be considered to be on the order of 10 to 30 mm. Also, while the constant A differs depending on the construction, the entrance pupil position, the focal length, etc., of the eyepiece, by determining the value of the aspherical coefficient $C_4$ to come within a range that satisfies a conditional expression of $1*10^{-6} < |C_4| < 1*10^{-3}$, it is possible to ensure a satisfactory compensation for the pupil aberration or distortion aberration of the ordinary eyepiece. If the value of $|C_4|$ exceeds the lower limit of the above conditional expression, the pupil aberration or the distortion aberration is undercompensated, whereas if it exceeds the upper limit, the pupil aberration is overcompensated. Further, while, in the foregoing description, the compensator plate $L_c$ is arranged on the image side, it may be arranged on the eyepoint side.

Next, consider a case in which the apex curvature $C_0$ is not zero, that is, the coefficient of the term of $y^2$ is not zero. Assume that the aspherical surface shape is given by the following equation.

$$x = p \cdot y^2 + q \cdot y^4$$

By differentiating this equation, we obtain the following equation.

$$\theta = 2p \cdot y + 4q \cdot y^3$$

Therefore, the pupil aberration $\Delta S'$ is given by the following equation.

$$\Delta S' = 2(n-1) \cdot \beta^2 \cdot p \cdot S^2 + 4(n-1)\beta^2 \cdot q \cdot S^2 \cdot y^2$$

In this equation, the first term of the right member is the same with that obtained when the apex curvature $C_0$ is zero. The second term is a constant term which does not include $y^2$ or a term representing the movement of the image point by the surface of the apex curvature $C_0$ and it has no bearing on the compensation of the pupil aberration. Therefore, even if the shape of the compensator plate includes that which corresponds to the term of $y^2$ (the quadratic surface), that is, even if the compensator plate is a lens having a refractive power, only the term of $y^4$ has an effect on the compensation of the pupil aberration and therefore the pupil aberration can be satisfactorily compensated for as long as the value of $|C_4|$ is within the range that satisfies the previously mentioned conditional expression.

Thus, in accordance with the present invention, by virtue of the fact that in the first lens group forming part of the eyepiece the positive lens has one of its surfaces formed into an aspherical surface, the compensation of pupil aberration can be effected satisfactorily as with the compensation by the previously mentioned compensator plate.

While, in the foregoing description, only the term of $y^4$ is described in connection with the shape of the compensator plate $L_c$, this is due to the fact that the complete compensation of pupil aberration can be effected only by the term of $y^4$ in the region of the third-order aberrations. However, deviation from the region of the third-order aberrations increases with increase in the field angle of the eyepiece, the complete compensation of the pupil aberration cannot be effected by the previously mentioned aspherical compensator plate based on the function represented by only the term of $y^4$. In such case, it is only necessary that any other higher-order compensation terms than the term of $y^4$ are added with respect to the aspherical surface shape of the compensator plate $L_c$.

The above and other objects, features and advantages of this invention will become more apparent from the following description of some preferred but not limitative embodiments taken in conjunction with the accompanying drawings.

BRIEF DESCRIPTION OF THE DRAWINGS

FIG. 3 shows schematically the construction of an eyepiece according to a second embodiment of the present invention.

FIGS. 4a, 4b, 4c, 4d shows aberration diagrams for the eyepiece according to the second embodiment shown in FIG. 3.

FIG. 7 shows schematically the construction of a conventional eyepiece.

FIGS. 8a, 8b, 8c, 8d shows aberration diagrams for the conventional eyepiece shown in FIG. 7.

DESCRIPTION OF THE PREFERRED EMBODIMENTS

Figure 1:
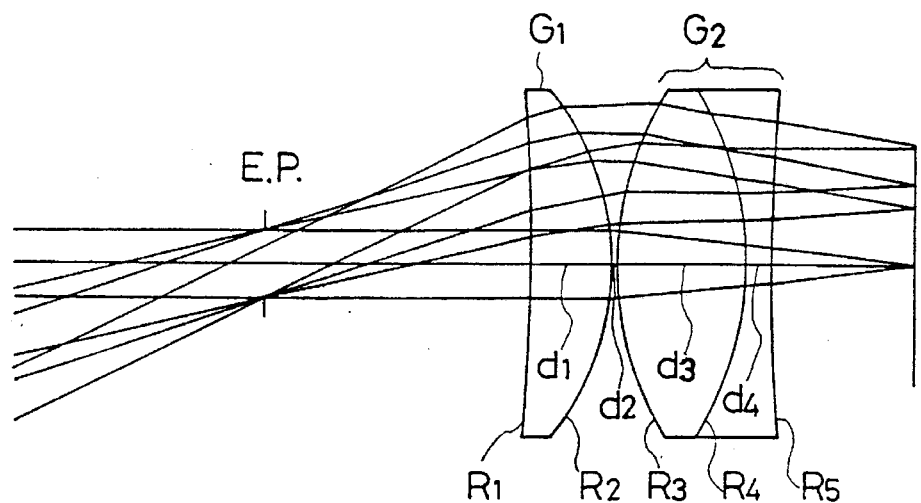
FIG. 1 shows schematically the construction of an eyepiece according to a first embodiment of the present invention.

Referring to FIG. 1, there is illustrated an eyepiece according to a first embodiment of the present invention including, in the order from the eyepoint (E.P.) side, a first lens group $G_1$ composed of a single positive lens component and a second lens group of a positive refractive power composed of a cemented lens of a positive lens and a negative lens, and an image-side lens surface $R_2$ of the first lens group $G_1$ is formed into an aspherical surface shape. The first lens group $G_1$ is made by using an optical glass material as its vitreous material. The focal length f of this eyepiece is 10 mm and its apparent field of view is 50°.

The following Table 1 shows the parameter values of the eyepiece according to the first embodiment.

TABLE 1

| $R_i$ | $r_i$ | $d_i$ | $n_i$ | $v_i$ |
|---|---|---|---|---|
| $R_1$ | −69.9 | 3.2 | 1.670 | 57.5 |
| $R_2$ | −9.4 | 0.2 | | |
| $R_3$ | 11.8 | 5.1 | 1.620 | 60.1 |
| $R_4$ | −11.3 | 1.0 | 1.805 | 25.3 |
| $R_5$ | 80.5 | | | |

$R_2$: aspherical surface $K = 0.43$
$C_4 = -0.18 \times 10^{-4}$
$C_6 = -0.53 \times 10^{-6}$
$C_8 = -0.32 \times 10^{-8}$
$C_{10} = -0.33 \times 10^{-12}$ Here, in Table 1 represented by $r_i$ is the radius of curvature of a lens surface $R_i$, $d_i$ the surface spacing on the optical axis between the lens surface $R_i$ and a lens surface $R_{i+1}$, $n_i$ the d-line refractive power of the medium between the lens surfaces $R_i$ and $R_{i+1}$, and $v_i$ the Abbe number of the medium between the lens surfaces $R_i$ and $R_{i+1}$. It is to be noted that the lens surface $R_2$ is formed into the aspherical surface shape given by the previously mentioned equation (10).

Figures 2A, 2B:
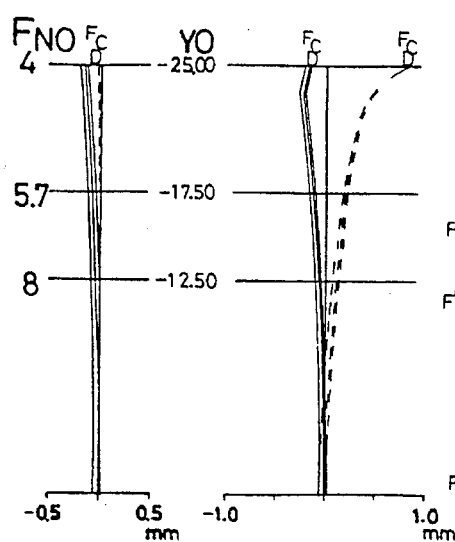
FIGS. 2a, 2b, 2c, 2d shows aberration diagrams for the eyepiece according to the first embodiment shown in FIG. 1.
Figures 2C, 2D:
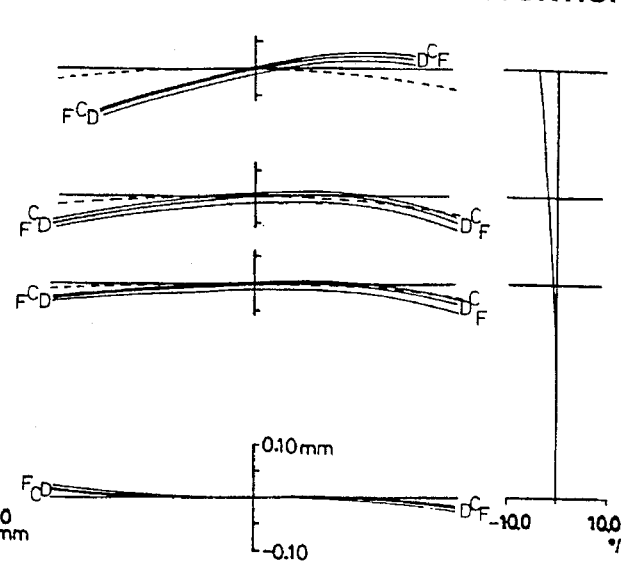
Figure 5:
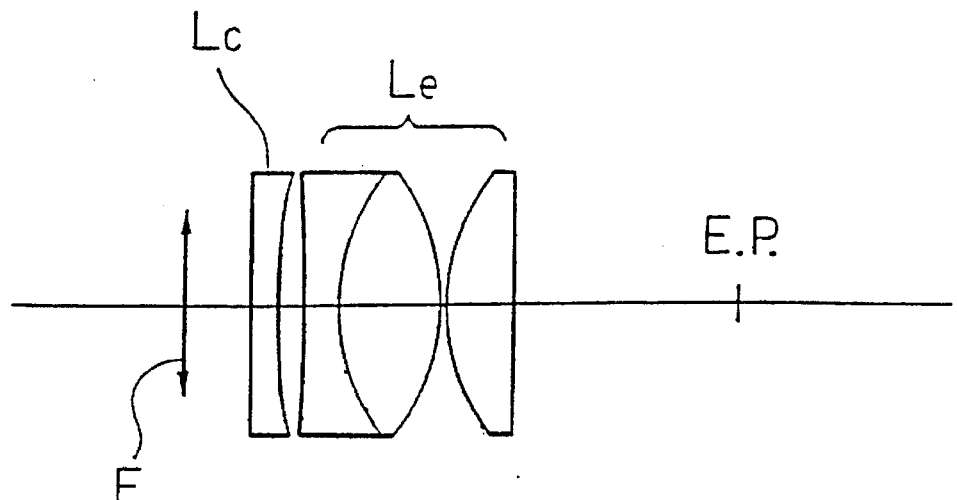
FIG. 5 is a diagram for explaining the principle of the present invention.
Figure 6:
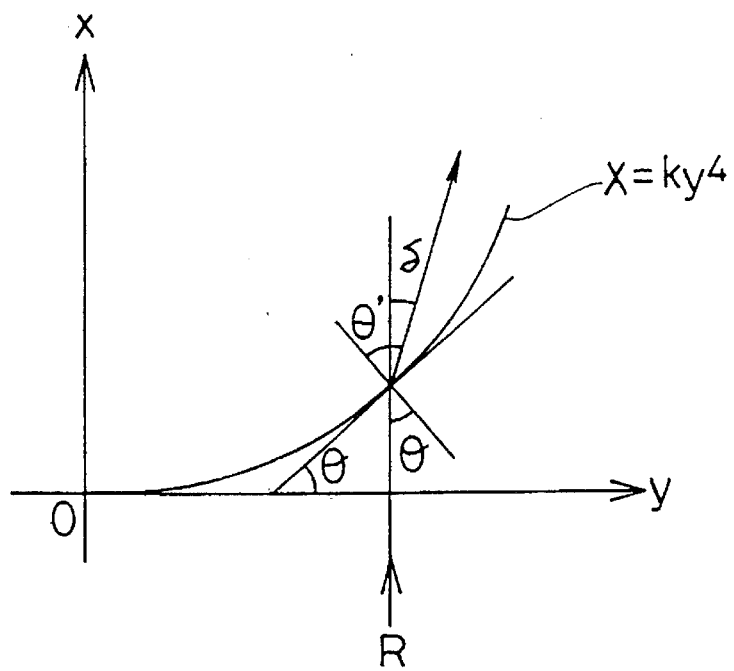
FIG. 6 is a graph for explaining the principle shown in FIG. 5.

The aberration diagrams of the eyepiece according to the first embodiment are as shown in FIG. 2. A comparison with the aberration diagrams of the conventional eyepiece shown in FIG. 8 shows that despite the apparent field of view being the same, the eyepiece of the present embodiment is improved not only in terms of astigmatism but also particularly in terms of distortion aberration.

Referring now to FIG. 3, there is illustrated the construction of an eyepiece according to a second embodiment of the present invention. The eyepiece of this embodiment includes, in the order from the eyepoint side, a first lens group $G_{11}$ composed of a single positive lens component and a second lens group $G_{12}$ of a positive refractive power composed of a cemented lens of a positive lens and a negative lens, and an image-side lens surface $R_{12}$ of the first lens group $G_{11}$ is formed into an aspherical surface shape. The first lens group $G_{11}$ is made by using a resinous optical material as a vitreous material. The focal length of this eyepiece is 10 mm and its apparent field of view is 50°.

The following Table 2 shows the parameter values of the eyepiece according to the second embodiment.

TABLE 2

| $R_i$ | $r_i$ | $d_i$ | $n_i$ | $v_i$ |
|---|---|---|---|---|
| $R_1$ | 58.3 | 4.0 | 1.491 | 57.6 |
| $R_2$ | −8.6 | 0.2 | | |
| $R_3$ | 11.8 | 5.1 | 1.620 | 60.1 |
| $R_4$ | −11.3 | 1.0 | 1.805 | 25.3 |
| $R_5$ | 80.5 | | | |

$R_{12}$: aspherical surface $K = 0.47$
$C_4 = 0.51 \times 10^{-4}$
$C_6 = -0.53 \times 10^{-6}$
$C_8 = -0.73 \times 10^{-8}$
$C_{10} = -0.33 \times 10^{-12}$ Here, in Table 2 represented by $r_i$ is the radius of curvature of a lens surface $R_i$, $d_i$ the surface spacing on the optial axis between the lens surface $R_i$ and a lens surface $R_{i+1}$, $n_i$ the d-line refractive power of the medium between the lens surfaces $R_i$ and $R_{i+1}$, and $v_i$ the Abbe number of the medium between the lens surfaces $R_i$ and $R_{i+1}$. In this connection, the lens surface $R_{12}$ is formed into the aspherical surface shape given by the previously mentioned equation (10) as with the lens surface $R_2$ in the first embodiment.

The aberration diagrams of the eyepiece according to the second embodiment are as shown in FIG. 4. From a comparison with the case of the conventional eyepiece shown in FIG. 8 it will be seen that despite the apparent field of view being the same, the eyepiece of this embodiment is improved not only in terms of astigmatism but also particularly in terms of distortion aberration.

Thus, in accordance with the second embodiment the aspherical surface shape according to the present invention is used for the image-side lens surface of the first lens group and thus various aberrations, particularly distortion aberration can be compensated satisfactorily even with its extremely simple construction of the three lenses in two groups.

Also, as will be seen from the first and second embodiments, either one of optical glass and resinous optical material may be used as the vitreous material for the positive lens of the first lens group. It is needless to say that the use of the resinous optical material is advantageous if the manufacturing cost is taken into consideration.

Further, while the above-described embodiments show the cases in which the apparent field of view is 50°, in accordance with the present invention the apparent field of view of the eyepiece is not limited to this value and it is possible to provide an eyepiece which maintains a satisfactory optical performance up to such apparent field of view of about 65° if increase in lens diameter is not objected to.

As described hereinabove, each of the embodiments realizes an eyepiece capable of satisfactorily compensating various aberrations, particularly distortion aberration despite its extremely simple lens construction of three lenses in two groups. Thus, there is the effect of accomplishing the desired reduction in the weight and size of the device itself.

What is claimed is:

1. An eyepiece comprising, in the order named, from an eyepoint side:

a first lens group having a positive refractive power; and a second lens group having a positive refractive power;

said first lens group including a positive lens, said second lens group consisting of a cemented lens formed by bonding a negative lens and a positive lens to each other, said cemented lens consisting of said positive lens and said negative lens, in the order named, from said eyepoint side, and said positive lens of said first lens group having at least one lens surface composed of an aspherical surface.

2. An eyepoint according to claim 1, wherein a radius of curvature at a peripheral portion of said aspherical surface is greater than a radius of curvature at an apex portion of said aspherical surface.

3. An eyepiece according to claim 1, wherein said aspherical surface is given by the following equation $$x = C_0 \cdot y^2 / \{1 + (1 - k \cdot C_0^2 \cdot y^2)^{1/2}\} + C_4 \cdot y^4 + C_6 \cdot y^6 + C_8 \cdot y^8 + C_{10} \cdot y^{10}$$

where x is the distance measured from the apex in the optical axis direction, y is the distance measured from the apex in a direction perpendicular to the optical axis, $C_0 = 1/R$, R is the radius of curvature of the apex, k is a conic constant, and $C_4$, $C_6$, $C_8$ and $C_{10}$ are respectively the fourth-order, sixth-order, eighth-order and tenth-order aspherical surface coefficients, and wherein said fourth-order aspherical surface coefficient $C_4$ satisfies a condition of $1*10^{-6}<|C_4|<1*10^{-3}$.

4. An eyepiece according to claim 3, wherein said aspherical surface is formed on a lens surface of the positive lens of said first lens group, which is on the opposite side from said eyepoint.

5. An eyepiece according to claim 3, wherein the positive lens of said cemented lens is composed of a lens having convex surfaces turned to both sides, and wherein the negative lens of said cemented lens is comprised of a lens having a concave surface turned to said eyepoint side.

6. An eyepiece comprising, in the order named, from an eyepoint side:

a first lens group having a positive refractive power; and a second lens group having a positive refractive power;

said first lens group including a positive lens, said second lens group including a cemented lens formed by cementing a negative lens and a positive lens together, said positive lens of said first lens group having at least one lens surface composed of an aspherical surface and wherein said aspherical surface is given by the following equation $$x=C_0 \cdot y^2/\{1+(1-k \cdot C_0^2 \cdot y^2)^{1/2}\}+C_4 \cdot y^4+C_6 \cdot y^6+C_8 \cdot y^8+C_{10} \cdot y^{10}$$

where x is the distance measured from the apex in the optical axis direction, y is the distance measured from the apex in a direction perpendicular to the optical axis, $C_0=1/R$, R is the radius of curvature of the apex, k is a conic constant, and $C_4$, $C_6$, $C_8$ and $C_{10}$ are respectively the fourth-order, sixth-order, eighth-order and tenth-order aspherical surface coefficients, and wherein said fourth-order aspherical surface coefficient $C_4$ satisfies a condition of $1*10^{-6}<|C_4|<1*10^{-3}$ and wherein the positive lens of said cemented lens is composed of a lens having convex surfaces turned to both sides, and wherein the negative lens of said cemented lens is comprised of a lens having a concave surface turned to said eyepoint side and wherein the positive lens of said first lens group is comprised of a meniscus-shaped lens.

7. An eyepiece according to claim 6, wherein the positive lens of said first lens group is comprised of an biconvex lens.

8. An eyepiece according to claim 7, wherein the positive lens of said first lens group is made of a resinous optical material.

9. An eyepiece consisting of, in the order named, from an eyepoint side:

a first lens group having a positive refractive power; and a second lens group having a positive refractive power;

said first lens group being composed of a positive lens, said second lens group consisting of a cemented lens formed by bonding a negative lens and a positive lens to each other, said cemented lens consisting of said positive lens and said negative lens, in the order named, from said eyepoint side, and said positive lens of said first lens group having at least one lens surface composed of an aspherical surface.

10. An eyepiece according to claim 9, wherein said aspherical surface is expressed by the following equation $$x=C_0 \cdot y^2/\{1+(1-k \cdot C_0^2 \cdot y^2)^{1/2}\}+C_4 \cdot y^4+C_6 \cdot y^6+C_8 \cdot y^8+C_{10} \cdot y^{10}$$

where x is the distance measured from the apex in the optical axis direction, y is the distance measured from the apex in a direction perpendicular to the optical axis, $C_0=1/R$, R is the radius of curvature at the apex, k is the conic constant, and $C_4$, $C_6$, $C_8$ and $C_{10}$ are respectively the fourth-order, sixth-order, eighth-order and tenth-order aspherical surface coefficients, and wherein said fourth-order aspherical surface coefficient $C_4$ satisfies a condition of $1*10^{-6}<|C_4|<1*10^{-3}$.

11. An eyepiece according to claim 10, wherein the positive lens of said cemented lens is composed of a lens having convex surfaces turned to both sides, and wherein the negative lens of said cemented lens is composed of a lens having a concave surface turned to said eyepoint side.

12. An eyepiece according to claim 11, wherein said aspherical surface is formed on a lens surface of the positive lens of said first lens group, which is on the opposite side to said eyepoint.

* * * * *